(12) United States Patent
Linde

(10) Patent No.: US 10,756,395 B2
(45) Date of Patent: Aug. 25, 2020

(54) BATTERY HAVING AN INTEGRATED FLAME RETARDANT DEVICE

(71) Applicant: Airbus Operations GmbH, Hamburg (DE)

(72) Inventor: Peter Linde, Hamburg (DE)

(73) Assignee: Airbus Operations GmbH (DE)

( * ) Notice: Subject to any disclaimer, the term of this patent is extended or adjusted under 35 U.S.C. 154(b) by 0 days.

(21) Appl. No.: 16/124,428

(22) Filed: Sep. 7, 2018

(65) Prior Publication Data

US 2019/0097274 A1     Mar. 28, 2019

(30) Foreign Application Priority Data

Sep. 27, 2017   (DE) .................. 10 2017 122 416

(51) Int. Cl.

| | |
|---|---|
| H01M 10/42 | (2006.01) |
| H01M 2/34 | (2006.01) |
| H01M 2/16 | (2006.01) |
| H01M 4/36 | (2006.01) |
| H01M 4/52 | (2010.01) |
| H01M 4/587 | (2010.01) |
| H01M 4/62 | (2006.01) |
| H01M 10/0525 | (2010.01) |
| B64D 41/00 | (2006.01) |
| B64D 11/00 | (2006.01) |

(52) U.S. Cl.
CPC ..... *H01M 10/4235* (2013.01); *H01M 2/1613* (2013.01); *H01M 2/348* (2013.01); *H01M 4/364* (2013.01); *H01M 4/366* (2013.01); *H01M 4/523* (2013.01); *H01M 4/587* (2013.01); *H01M 4/622* (2013.01); *H01M 10/0525* (2013.01); *B64D 41/00* (2013.01); *B64D 2011/0053* (2013.01); *H01M 2200/00* (2013.01); *H01M 2220/20* (2013.01)

(58) Field of Classification Search
CPC ................................................. H01M 2220/20
See application file for complete search history.

(56) References Cited

U.S. PATENT DOCUMENTS

| | | | |
|---|---|---|---|
| 3,829,331 A | 8/1974 | Tsang | |
| 4,216,280 A * | 8/1980 | Kono ..................... | H01M 2/14 429/247 |
| 8,530,551 B2 | 9/2013 | Eckel et al. | |

(Continued)

FOREIGN PATENT DOCUMENTS

| | | |
|---|---|---|
| DE | 000002353378 A1 | 5/1975 |
| DE | 10 2008 034 658 A1 | 4/2009 |

(Continued)

*Primary Examiner* — Milton I Cano
*Assistant Examiner* — Mary G Henshaw
(74) *Attorney, Agent, or Firm* — Lerner, David, Littenberg, Krumholz & Mentlik, LLP

(57) ABSTRACT

A battery has an integrated flame retardant device, wherein the battery has: a cathode layer, a separating layer, and an anode layer, wherein the separating layer is arranged between the cathode layer and the anode layer, wherein the separating layer is impermeable to electrons and permeable to at least one positive type of ion, wherein the separating layer has a flame retardant device having at least one glass fibre, which includes a closed cavity, and wherein a flame retardant is arranged in the cavity. The battery has increased fire resistance.

16 Claims, 4 Drawing Sheets

(56) References Cited

U.S. PATENT DOCUMENTS

| | | | |
|---|---|---|---|
| 2007/0151926 A1 | 7/2007 | Calundann et al. | |
| 2012/0074617 A1 | 3/2012 | Eckel et al. | |
| 2016/0248061 A1 | 8/2016 | Brambrink et al. | |
| 2017/0098856 A1* | 4/2017 | Zhamu | H01M 4/131 |
| 2018/0331386 A1* | 11/2018 | Koh | H01M 10/04 |
| 2019/0092488 A1* | 3/2019 | Veto | B64D 41/00 |

FOREIGN PATENT DOCUMENTS

| | | |
|---|---|---|
| DE | 10 2010 041387 A1 | 3/2012 |
| EP | 3 053 206 B1 | 8/2017 |
| WO | 2004/055097 A1 | 7/2004 |

* cited by examiner

BATTERY HAVING AN INTEGRATED FLAME RETARDANT DEVICE

FIELD OF THE INVENTION

The invention relates to a battery having an integrated flame retardant device.

BACKGROUND OF THE INVENTION

In order to store electric energy for subsequent discharge, batteries or accumulators are used. They enable power to be supplied independently of power supply networks or electric generators. Batteries can also be used to supply electric loads in aircraft.

For general use outside aircraft, composite batteries are known and, in their basic form, these have three layers. In this case, a separating layer is arranged between a cathode layer and an anode layer. The cathode layer and the anode layer can comprise a polymer, which is reinforced by carbon fibres. In this case, the fibres of the cathode layer can be coated, e.g. with iron oxide. The separating layer can be composed of a polymer with a reinforcement consisting of glass fibres. The separating layer acts as an electric insulator for electrons. In this case, lithium ions can pass through the separating layer but electrons cannot. Since the lithium ions are inflammable, the use of lithium ion batteries or accumulators in aircraft is critical since aircraft have only limited extinguishing capacities.

In this context, DE 10 2010 041387 A1 or EP 3 053 206 B1, for example, disclose the use of flame retardants in the housing of unstructured lithium ion batteries. However, the lithium ion batteries may start to burn within the housing since it is only at the housing of the battery that a fire comes into contact with the flame retardant, that is to say that the housing of the battery may reach high temperatures owing to the flames. This can damage the surroundings of the housing and, in the worst case, can lead to ignition of the materials surrounding the housing.

BRIEF SUMMARY OF THE INVENTION

An aspect of the invention may provide a battery which has increased fire resistance.

According to an embodiment of the invention, a battery having an integrated flame retardant device is provided, wherein the battery has an anode layer, a separating layer, and a cathode layer, wherein the separating layer is arranged between the cathode layer and the anode layer, wherein the separating layer is impermeable to electrons and permeable to at least one positive type of ion, wherein the separating layer has a flame retardant device having at least one glass fibre, which has a closed cavity, and wherein a flame retardant is arranged in the cavity.

According to an aspect of the invention, the glass fibres are destroyed and the cavity opened in the case of an increase in the temperature in the battery, with the result that the flame retardant escapes and develops its flame inhibiting action. The fire risk due to the lithium ions arranged in the battery is thus significantly reduced by the escaping flame retardant. If a source of fire develops in the battery or flashes over to the battery from an external source of fire, the flame retardant escaping through the destruction of the glass fibres can inhibit the fire and, in the ideal case, also extinguish it. Outside a fire incident, the glass fibres reinforce the separating layer and furthermore act as electric insulators between the cathode layer and the anode layer. The battery is thus provided with multifunctional glass fibres which additionally provide a fire safety function in a simple and space-saving manner. The fire resistance of the battery is thus increased.

It is advantageous if the at least one glass fibre has a critical temperature, wherein the glass fibre breaks when the critical temperature is exceeded, and the flame retardant escapes from the cavity.

By means of the critical temperature, it is possible to predetermine under precisely what temperature conditions the flame retardant is supposed to escape from the cavity. Furthermore, this avoids the need for the glass fibre first of all to melt in order to open the cavity, i.e. for destruction of the glass fibre by a melting process to occur. On the contrary, the glass fibre disintegrates due to internal stresses which arise owing to the temperature difference across the cross section of the glass fibre before the melting point of the glass fibre is reached. In contrast to the melting of the glass fibre, disintegration ensures that the cavity within the glass fibre is opened above the critical temperature instead of the molten glass continuing to seal the cavity or resealing it after initial opening in an unfavourable case.

It is expedient if the quantity of flame retardant is dimensioned in such a way that a fire in the battery is suppressed after the flame retardant escapes from the cavity.

In this way, the quantity of flame retardant can be matched precisely to the boundary conditions within the separating layer or the battery, and therefore sufficient flame retardant is available to extinguish a fire in the battery. Furthermore, it is thereby possible to avoid overdimensioning the quantity of flame retardant, and therefore costs for the flame retardant can be saved in the production of the battery.

It is advantageous if the flame retardant is triphenylphosphate.

Triphenylphosphate has proven to be a very effective flame retardant for lithium ion batteries. An effective flame retardant for lithium ion batteries is thus provided. Furthermore, the required quantity of flame retardant can be further reduced by the effectiveness of the triphenylphosphate, and therefore additional costs can be saved, at least in production. Thus, in a first illustrative embodiment, it is possible for only a partial quantity of the glass fibres to have a cavity containing flame retardant. As an alternative or in addition, it is also possible to use glass fibres with only very small cavities, thus also making it possible to reduce the overall diameter of the glass fibres. This saves weight and costs. Saving weight is advantageous especially in aircraft construction.

It is advantageous if the separating layer comprises a polymer, in which the at least one glass fibre extends as a reinforcing fibre.

It is furthermore expedient if the separating layer has a multiplicity of glass fibres having a cavity, which preferably form a glass fibre mat.

By providing a multiplicity of glass fibres having a cavity, the flame retardant can be distributed uniformly within the separating layer. An effective fire retardant effect is thereby provided over the entire area of the separating layer. If the glass fibres additionally form a glass fibre mat, it is thereby possible to avoid the formation of empty spaces between the glass fibres which cannot be supplied with a flame retardant. Furthermore, a glass fibre mat increases the stability of the separating layer and hence also of the battery.

It is advantageous if the cavity extends along the glass fibre, preferably along the entire glass fibre.

In contrast to a cavity which extends over only a short section of the total length of the glass fibre, a cavity which extends along the entire glass fibre makes it possible to provide a fire retardant effect over the entire length of the glass fibre. Since the glass fibre can provide an opening to the cavity containing the flame retardant at every point at which it breaks due to a temperature increase, fire safety is further increased.

Furthermore, it is advantageous if the at least one glass fibre has an outside diameter of between 8 µm and 14 µm, preferably between 10 µm and 12 µm.

Glass fibres with these outside diameters are strong enough to bring about a reinforcing effect in the polymer of the separating layer. Thinner glass fibres would not have the required reinforcing effect if they were simultaneously supposed to store sufficient flame retardant within a cavity to achieve an adequate fire retardant effect. If the glass fibres are too thick, it is not possible to ensure that they open at the correct time in the event of a fire in order to enable the flame retardant to escape from the cavity of the glass fibre.

It is advantageous if the cavity has a diameter of between 4 µm and 7 µm, preferably between 5 µm and 6 µm.

A cavity with a diameter in this range can hold sufficient flame retardant to develop a flame retardant effect. Moreover, at these diameters, adhesion and cohesion forces are not strong enough to hold the flame retardant in the cavity when the cavity opens.

It is advantageous if the cathode layer contains carbon fibres that comprise an iron oxide coating, wherein the carbon fibres are embedded in a polymer in the cathode layer.

Furthermore, an aircraft is provided which, according to an embodiment of the invention, comprises at least one battery in accordance with the above description, at least one electric load, and at least one electric lead, wherein the battery is connected to the electric load via the electric lead.

Thus, an aircraft is provided which can have a rechargeable lithium ion battery for supplying electric loads within the aircraft, wherein the battery has increased fire resistance.

It is advantageous if the at least one battery is arranged in a cabin panel or a structure, in particular a laminated shell or a frame structure, of the aircraft.

Thus, batteries can be distributed in a flexible manner within the aircraft. Furthermore, the batteries can be arranged in a space-saving and yet easily accessible manner in the interior of the aircraft if, for example, they are secured behind a panel. In this way, the batteries can also be arranged close to the electric loads, with the result that just one supply line has to be laid to the battery and it is possible for branching to the electric loads to take place only afterwards. As a result, the structure of an aircraft is significantly simplified and only a small number of electric loads are affected if a battery fails. Furthermore, the elimination of electric leads also makes it possible to save weight.

According to an aspect of the invention, a method for producing a battery having an integrated flame retardant device is furthermore provided, wherein the method has the following steps: a) providing at least one glass fibre having a cavity; b) filling the cavity with a flame retardant; c) closing the cavity; and d) arranging the at least one glass fibre in a separating layer of a battery, wherein the separating layer is applied to a cathode layer or an anode layer.

BRIEF DESCRIPTION OF THE DRAWINGS

The invention is described below with reference to an illustrative embodiment by means of the attached drawing, in which.

DETAILED DESCRIPTION

Figure 1:
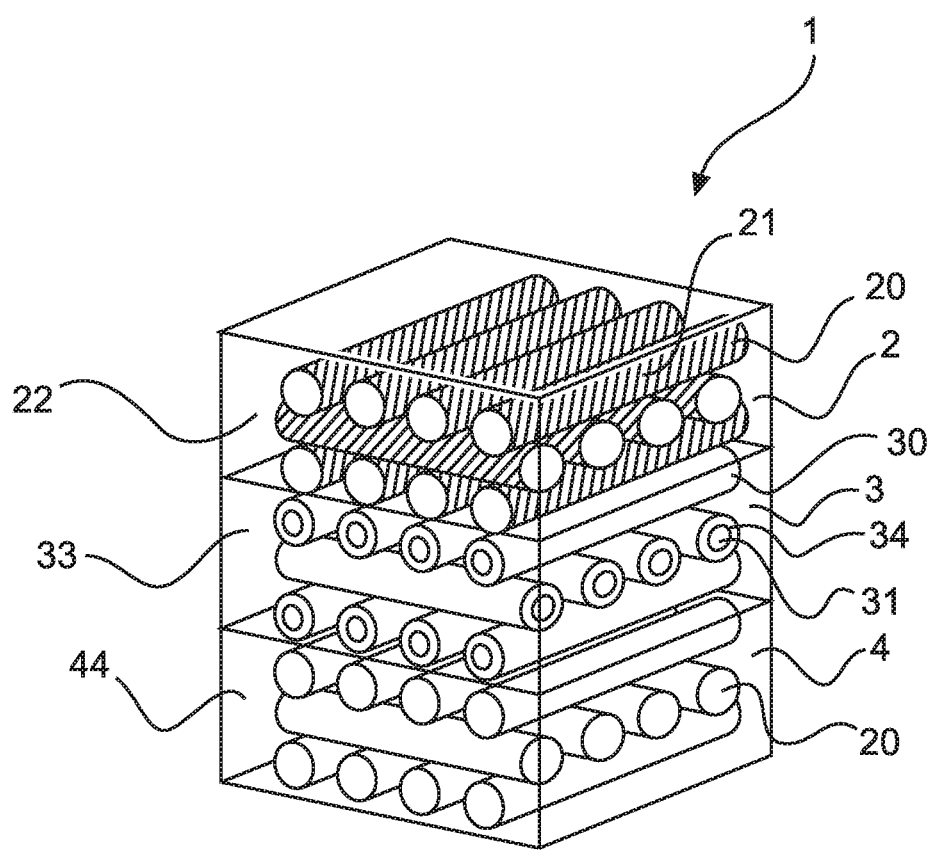
FIG. 1 shows a schematic illustration of a battery having an integrated flame retardant device.

The battery is denoted overall by the reference sign 1 below, as illustrated in FIG. 1.

The battery 1 comprises a cathode layer 2, a separating layer 3 and an anode layer 4. The separating layer 3 is arranged between the cathode layer 2 and the anode layer 4.

In this case, the anode layer 4 comprises a polymer 44, which is reinforced with carbon fibres 20. The anode layer 4 can furthermore be connected to a collector layer (not shown), which establishes contact with an electric lead.

The cathode layer 2 comprises a polymer 22, which is likewise reinforced with carbon fibres 20. The carbon fibres 20 are furthermore provided with a coating 21 of iron oxide. The cathode layer 2 can furthermore be connected to a collector layer (not shown), which establishes contact with an electric lead.

The separating layer 3 comprises a polymer 33, which is reinforced with glass fibres 30. Here, the separating layer 3 allows through positive ions, e.g. lithium ions. The separating layer 3 is impermeable to electrons. During the charging process, positive ions pass from the anode layer 4 to the cathode layer 2 through the separating layer 3. The electrons are fed in from outside via the cathode layer 2 to compensate for the charge of the positive ions. During the discharge process, the positive ions pass from the cathode layer 2 to the anode layer 4 through the separating layer 3. Here too, electrons are fed in via the anode layer 4 to compensate for the charge of the positive ions.

Figure 2:
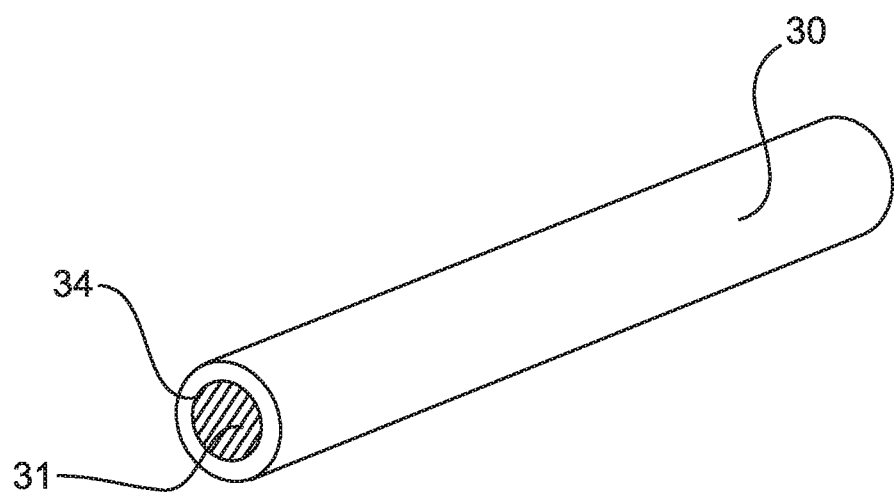
FIG. 2 shows a schematic illustration of a glass fibre having a cavity and flame retardant.

In this case, as illustrated in FIG. 2, the glass fibres 30 have cavities 34, which extend along the entire glass fibre 30. Here, the cavities 34 are closed. Furthermore, the cavities 34 contain a flame retardant 31. The flame retardant 31 can be triphenylphosphate.

The glass fibres 30 are woven into a glass fibre mat. Empty spaces between the glass fibres 30 are thereby avoided. If all the glass fibres 30 have a cavity 34 containing flame retardant 31, the glass fibre mat enables the entire area of the separating layer 3 to be covered with flame retardant 31 from the cavities 34 of the glass fibres 30. Thus, fire resistance can be increased over the entire area of the separating layer 3 since glass fibres 30 having cavities 34 which can supply flame retardant 31 when there is a temperature increase in the event of fire are arranged at every point of the separating layer 3.

Figure 3A:
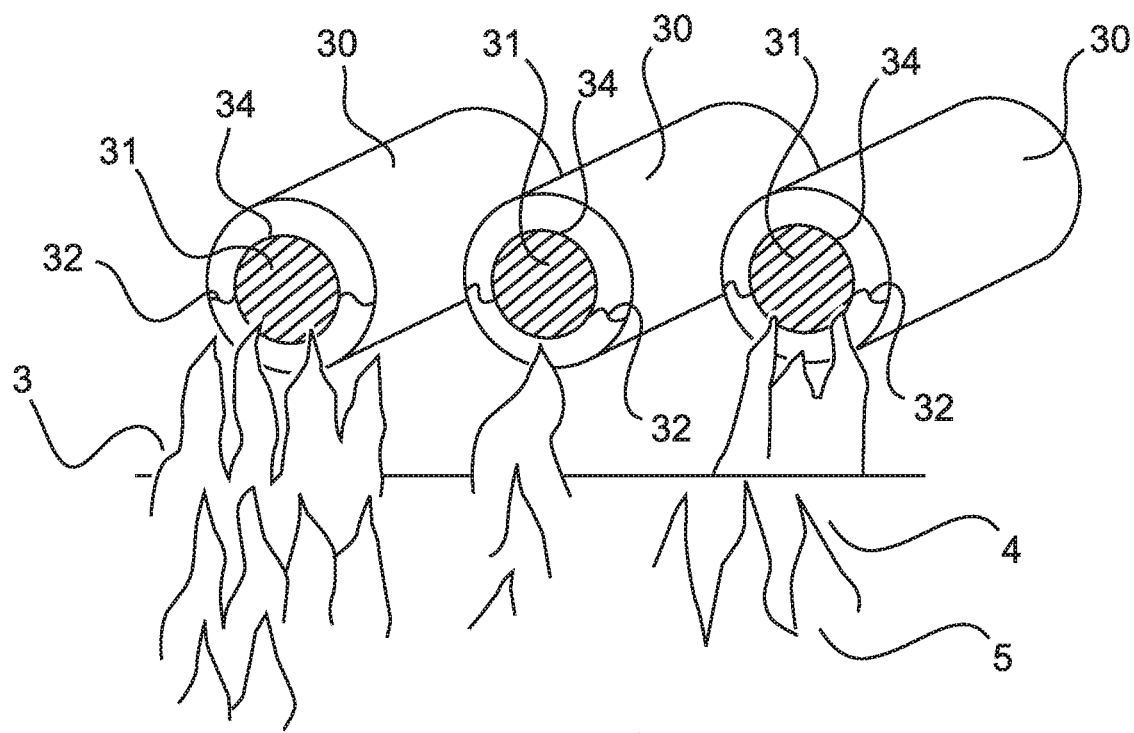
FIGS. 3a and 3b show schematic illustrations of glass fibres having a cavity and flame retardant above another, burning layer.
Figure 3B:
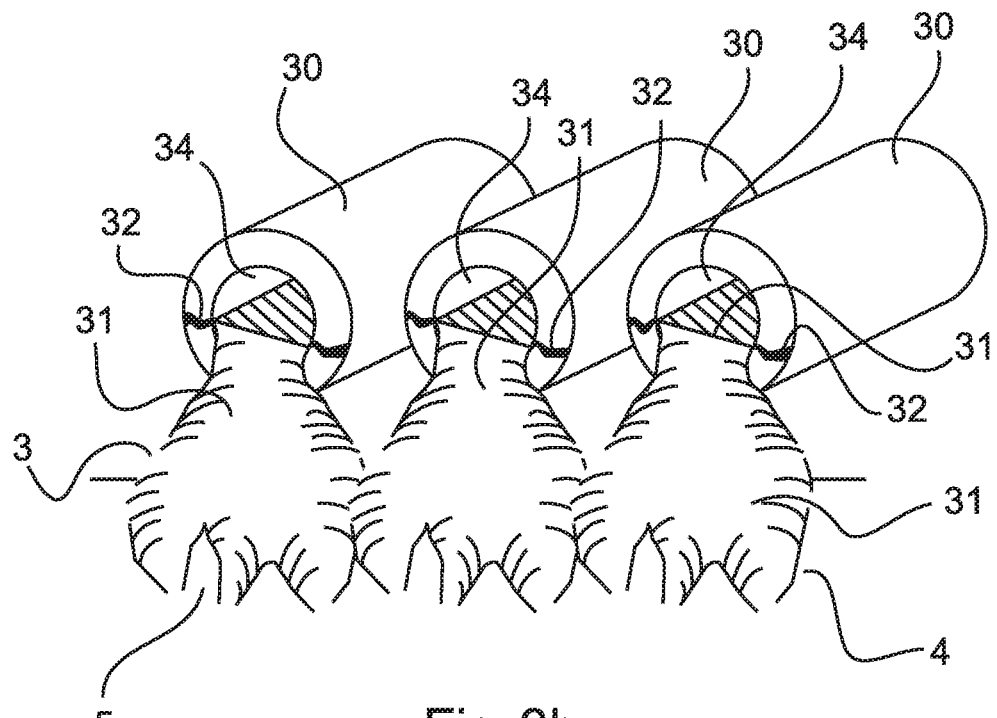

The glass fibres 30 are furthermore designed in such a way that they start to break above a critical temperature when there is a temperature increase. This is illustrated in FIG. 3a, in which a fire 5 has developed in the anode layer 4. Here, the glass fibres 30 have cracks 32, which extend through the wall of the glass fibre 30 almost as far as the cavity 34. The cracks 32 can arise from internal stresses in the glass fibre 30, caused by temperature differences between different regions across the cross section of the glass fibre 30. If the critical temperature is exceeded, the walls of the glass fibre 30 open at the cracks 32, opening the cavity 34 of the glass fibre 30. The flame retardant 31 then emerges from the cavity 34 to the outside through the glass fibre 30. Here, FIG. 3*b* illustrates that flame retardant 31 is inhibiting the fire 5 and is about to extinguish the fire 5.

Here, the amount of flame retardant 31 is sufficient to enable a fire 5 within the battery 1 to be extinguished.

The glass fibres 30 furthermore have an outside diameter of between 10 μm and 12 μm. Thus, the glass fibres 30 have an outside diameter which is dimensioned so that, in the event of a fire, the glass fibres 30 can disintegrate due to the increase in temperature and the cavity 34 within the glass fibre 30 can be opened.

The cavity 34 has an inside diameter of from 5 μm to 6 μm. This diameter is adequate to accommodate sufficient flame retardant 31 to increase the desired fire retardant effect.

Figure 4A:
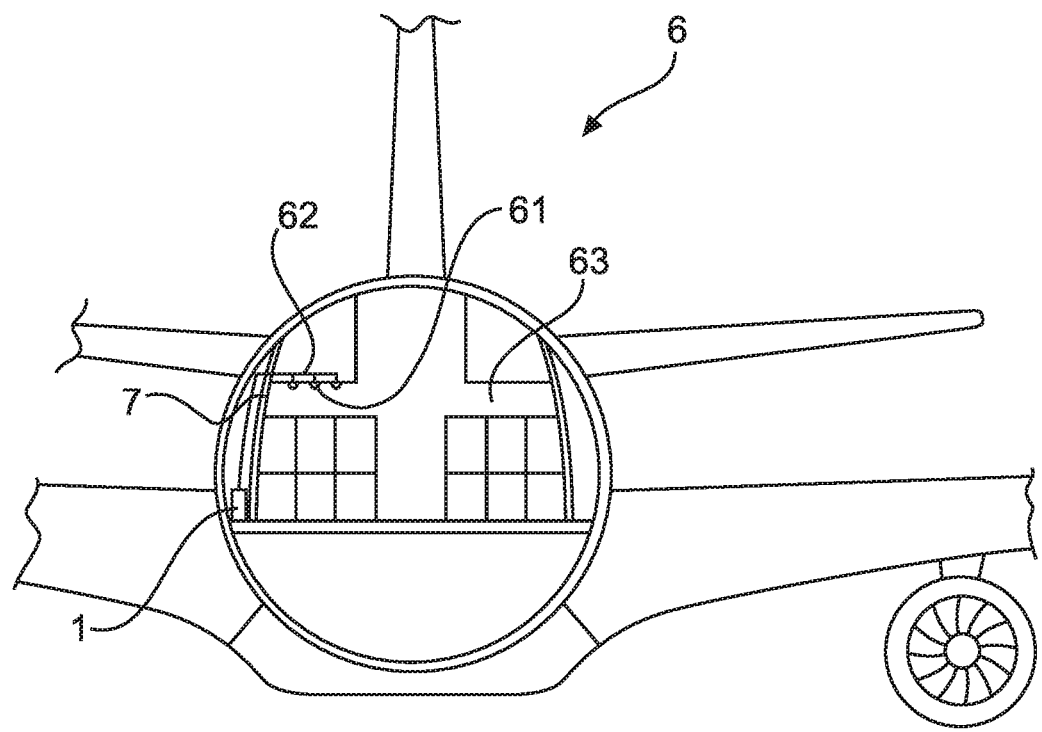
FIGS. 4a and 4b show schematic illustrations of aircraft with a battery having an integrated flame retardant device.

A cross section through an aircraft 6 is illustrated schematically in FIG. 4*a*. Arranged in an interior 63 of the aircraft 6 in this case is a cabin panel 7, which lines the outer wall of the interior 63. In this case, a battery 1 is arranged behind the panel 7. The battery 1 is connected by means of electric leads 62 to electric loads 61—in this case reading lights. Here, the battery 1 supplies the electric loads 61 via the electric leads 62.

As an alternative or in addition, the battery 1 can be integrated into the panel 7 (not shown). In this case, the battery 1 is part of the panel 7 and can therefore be produced at the same time as the panel 7. It is thereby possible to combine working steps and to save costs in production. Moreover, the battery 1 cannot become detached from the panel 7, and therefore there is no need to check the fastening of the battery 1 during a maintenance process. It is thereby possible to lower maintenance costs.

In this case, the battery 1 can furthermore be electrically connected (not shown) to a generator or a fuel cell or an additional battery which has a significantly higher capacity than the battery 1. This connection is then used to charge the battery 1.

Figure 4B:
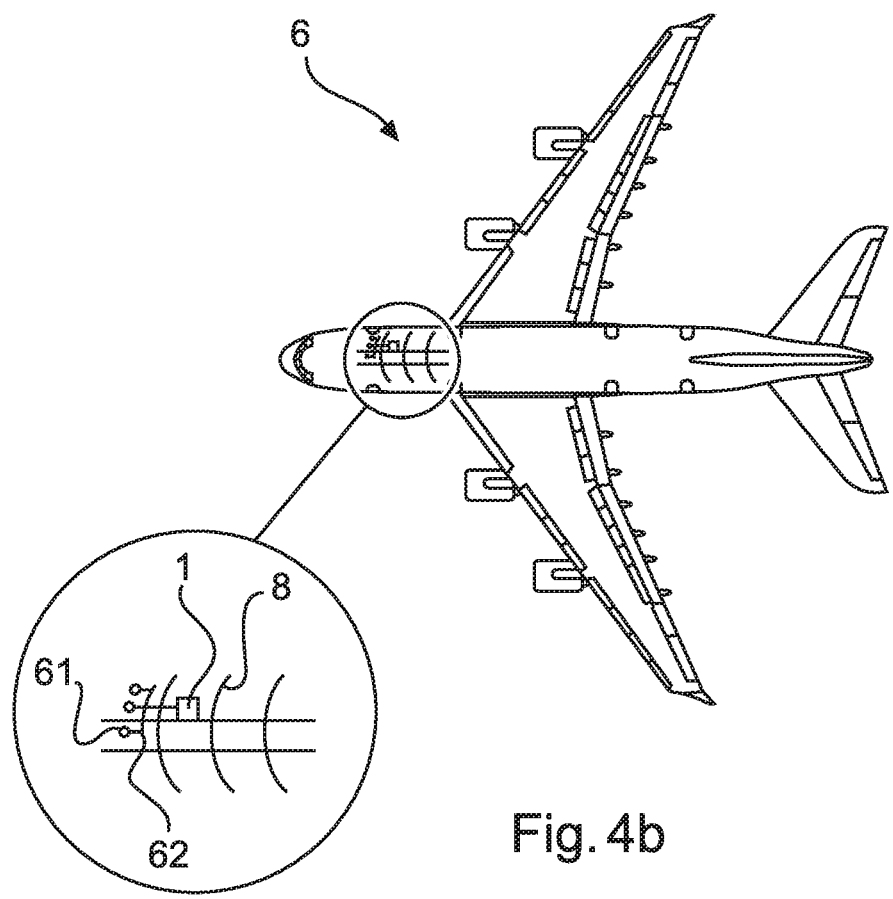

FIG. 4*b* likewise shows a schematic illustration of an aircraft 6. In this illustrative embodiment, the battery 1 is secured on a supporting structure 8 of the aircraft 6. Here too, the battery 1 is connected to electric loads 61 by means of electric leads 62. The battery 1 supplies the electric loads 61.

This battery 1 too can be connected by means of a further electric lead (not shown) to an energy source or an energy storage device which has a larger capacity than that of the battery 1.

In this case, the battery 1 can be arranged and/or secured on almost any of the elements of the aircraft structure of an aircraft 6. Thus, the battery 1 can be arranged in a flexible manner, as required, in an aircraft 6 and can supply power for electric loads in a decentralized way. Here, the battery 1 has a high fire resistance, which is essential in aircraft construction.

Figure 5:
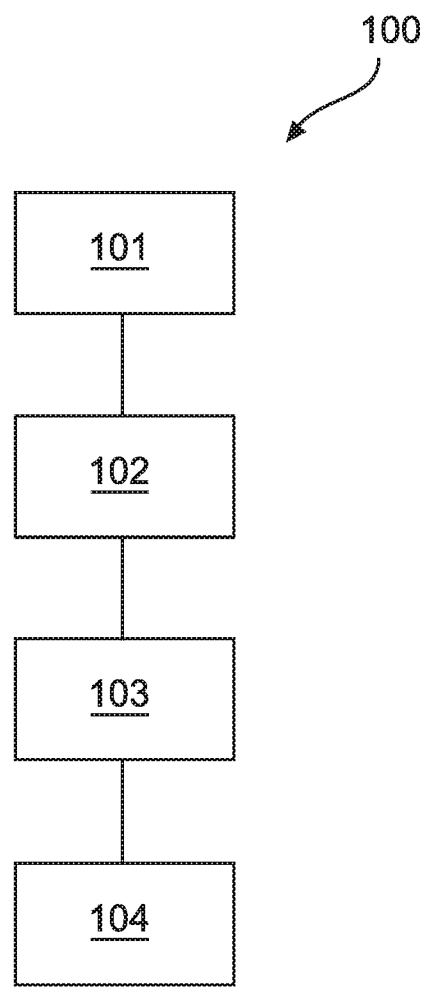
FIG. 5 shows a schematic flow diagram of the method for producing a battery having an integrated flame retardant device.

FIG. 5 shows a schematic illustration of a flow diagram of the method 100 for producing a battery having an integrated flame retardant device.

In this case, the method 100 comprises step a), providing 101 at least one glass fibre having a cavity. Here, the glass fibre can have a diameter of from 10 μm to 12 μm. In this case, the cavity in the glass fibre can have a diameter of from 5 μm to 6 μm. In this case, the cavity can extend over the entire length of the glass fibre.

In a second step b), the cavities are filled 102 with a flame retardant. During this process, triphenylphosphate can be fed into the cavity. However, it is also possible to use a different flame retardant.

In a third step c), the cavity is closed. This can be accomplished by melting the ends of the glass fibre, for example, or by heating the ends of the glass fibre and then compressing the ends of the glass fibre, for example. In this way, the flame retardant is trapped in the cavity and cannot escape from the cavity. Only if the wall of the cavity is destroyed can the flame retardant escape from the cavity.

In a fourth step d), the glass fibre having the cavity is arranged 104 in a separating layer of a battery. In this case, a multiplicity of glass fibres having cavities and flame retardant contained therein can be arranged in a separating layer. The separating layer can furthermore comprise a polymer in which the glass fibres are embedded as reinforcing fibres.

Furthermore, the glass fibres can be woven into a glass fibre mat which covers the entire separating layer. In this way, the flame retardant in the cavities of the glass fibres can be distributed over the entire separating layer by means of the glass fibres. Furthermore, the stability of the separating layer is increased by the glass fibre mat.

Here, the separating layer can be secured on an anode layer or a cathode layer of a battery. If the separating layer is secured on an anode layer of a battery, a cathode layer is arranged and secured on the separating layer. If the separating layer is secured on a cathode layer of a battery, an anode layer is arranged and secured on the separating layer.

Here, the separating layer acts as an electric insulator. In this case, the electric insulation is with respect to the electrons. Positive ions can pass through the separating layer. In this arrangement, the positive ions can pass backward and forward in both directions between the anode layer and the cathode layer.

After production, the battery can be arranged in an aircraft. In this case, the battery can supply electric energy in a decentralized manner at various points in the aircraft. Thus, for example, the battery can be arranged behind an aircraft panel. As an alternative or in addition, the battery can be secured on a structure of the aircraft, e.g. in a laminated shell or in the frame structure.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A battery having an integrated flame retardant device, wherein the battery comprises:
   a cathode layer;
   a separating layer; and
   an anode layer,
   wherein the separating layer is arranged between the cathode layer and the anode layer, wherein the separating layer is impermeable to electrons and permeable to at least one positive type of ion, wherein the separating layer has a flame retardant device having at least one hollow glass fibre comprising a closed cavity enclosed by the at least one glass fibre, and wherein a flame retardant is arranged in the closed cavity within the at least one glass fibre.

2. The battery according to claim 1, wherein the at least one glass fibre has a critical temperature, and wherein the at least one glass fibre is configured to break when the critical temperature is exceeded, and the flame retardant is configured to escape from the closed cavity of the at least one glass fibre.

3. The battery according to claim 2, wherein the quantity of flame retardant is dimensioned in such a way that a fire in the battery is suppressed after the flame retardant escapes from the closed cavity of the at least one glass fibre.

4. The battery according to claim 1, wherein the flame retardant is triphenylphosphate.

5. The battery according to claim 1, wherein the separating layer comprises a polymer, in which the at least one glass fibre extends as a reinforcing fibre.

6. The battery according to claim 1, wherein the at least one glass fibre of the separating layer comprises a plurality of glass fibres each having a closed cavity therewithin.

7. The battery according to claim 6, wherein the plurality of glass fibers form a glass fiber mat.

8. The battery according to claim 1, wherein the closed cavity of the at least one glass fibre extends along the at least one glass fibre.

9. The battery according to claim 1, wherein the at least one glass fibre has an outside diameter of between 8 μm and 14 μm.

10. The battery according to claim 1, wherein the at least one glass fibre has an outside diameter of between 10 μm and 12 μm.

11. The battery according to claim 1, wherein the closed cavity of the at least one glass fibre has a diameter of between 4 μm and 7 μm.

12. The battery according to claim 1, wherein the closed cavity of the at least one glass fibre has a diameter of between 5 μm and 6 μm.

13. The battery according to claim 1, wherein the cathode layer contains carbon fibres that comprise an iron oxide coating, and wherein the carbon fibres are embedded in a polymer in the cathode layer.

14. An aircraft comprising:
at least one battery of claim 1;
at least one electric load; and
at least one electric lead,
wherein the at least one battery is connected to the electric load via the electric lead.

15. The aircraft according to claim 14, wherein the at least one battery is arranged in a cabin panel or a structure, of the aircraft.

16. The aircraft according to claim 15, wherein the at least one battery is arranged in a laminated shell or in a frame structure of the aircraft.

* * * * *